Patented Dec. 14, 1948

2,456,500

UNITED STATES PATENT OFFICE 2,456,500

PURIFICATION OF DIARYL MONOSULFIDES

Everett E. Gilbert, New York, and Howard D. Segool, Flushing, N. Y., assignors to Allied Chemical & Dye Corporation, a corporation of New York No Drawing. Application June 11, 1946, Serial No. 676,100

8 Claims. (Cl. 260—609)

This invention relates to purification of diaryl monosulfides.

Diphenyl monosulfide may be produced by reaction of diphenyl sulfone with sulfur at temperatures of the order of 300° to 400° C.; by reacting benzene, sulfur chloride and aluminum chloride as described in "Organic Syntheses," vol. 14, pages 36 and 37 (1934); by reacting benzene and sulfur at elevated temperatures, if desired in the presence of aluminum chloride; by reacting benzene and sulfur monochloride in the presence of zinc dust; or by reacting chlorbenzene and aqueous sodium sulfide under heat and pressure; other diaryl monosulfides may be produced in similar manners. The diphenyl monosulfide produced by such processes, however, is in crude form, being dark-colored and malodorous, and generally contains thiophenol and diphenyl disulfide as impurities; such product is not suitable for use for purposes for which pure diphenyl monosulfide is adapted, e. g. as a plasticizer, insecticide or dye intermediate. The "Organic Syntheses" reference suggests diphenyl monosulfide produced by the process therein described may be purified by digestion with zinc dust and 40% sodium hydroxide; we have found the product obtained by such procedure, however, may not have a satisfactory color. United States Patent 2,102,200 of December 14, 1937, describes a process for deodorizing crude diphenyl monosulfide by treatment with chlorine or other halogens; this process, however, converts the thiophenol impurity to diphenyl disulfide, which is difficult to remove from the desired monosulfide, so that such process does not provide a satisfactory method for purifying a crude diphenyl monosulfide product.

It is an object of this invention to provide an improved process for purification of crude diaryl monosulfides, particularly diphenyl monosulfide.

In accordance with this invention a crude diaryl monosulfide having an objectionable color and odor is purified to form a substantially colorless and odorless product free of the corresponding disulfide and thiophenol by subjecting it to the action of a mixture of a metal above hydrogen in the electromotive series and an aqueous solution of an inorganic acid reactable with such metal to yield nascent hydrogen, at a temperature between about 30° and about 100° C., separating the diaryl monosulfide from the mass and then distilling to remove the thiophenol. The product of our process, we have found, has a superior color to the product obtained by treating a crude diaryl monosulfide product with zinc dust and aqueous sodium hydroxide. Further, such product is free of the corresponding disulfide. Hence it is evident our process yields products which are substantially purer than products obtained by either of the purification methods suggested by the prior art.

The crude diphenyl monosulfide treated in accordance with the preferred embodiment of our invention may be any crude diphenyl monosulfide having objectionable color and odor, prepared, for example, by reaction of diphenyl sulfone with sulfur, by reaction of benzene, sulfur, chloride and aluminum chloride or by other suitable methods. Reaction of diphenyl sulfone with sulfur is a particularly effective method for producing the monosulfide, the reaction being carried out by reacting diphenyl sulfone and sulfur at a temperature of 300° to 400° C. and distilling the diphenyl monosulfide product from the reaction vessel; a typical product prepared by such process has a yellow color and objectionable odor, boils over a 10° C. range and contains about 10% by weight thiophenol and about 5% by weight diphenyl disulfide. Our invention is particularly adapted for purification of such a product. However, our invention is also useful for purifying crude diphenyl monosulfide obtained by other procedures; for example the product obtained by reacting benzene, sulfur chloride and aluminum chloride, which typically has a yellow color and objectionable odor. boils over a 15° C. range and contains appreciable amounts of diphenyl disulfide and thiophenol.

In accordance with our invention the crude diphenyl monosulfide is mixed with a metal above hydrogen in the electromotive series, e. g. iron, zinc, aluminum, magnesium or nickel, and an aqueous solution of an inorganic acid reactable with the metal to yield nascent hydrogen, and the mixture thus formed subjected to a temperature between about 30° and about 110° C. with strong agitation, whereby nascent hydrogen is evolved. The acid employed may be any strong inorganic acid such as sulfuric or hydrochloric acid which reacts with the metal to yield nascent hydrogen. The amount of metal admixed with the crude diphenyl monosulfide may vary between about 5% and about 30% by weight thereof, and the amount of acid utilized should be at least 10% in excess of that required to react with the metal. A suitable method of carrying out the purification is to mix the crude diphenyl monosulfide with the metal and with an amount of water between 30% and 70% by weight of the crude monosulfide, heat the mixture to reflux and gradually add the acid to the refluxing mass with agitation, digestion and agitation being continued for 1 to 6 hours after addition of the acid is complete to insure adequate contact between the nascent hydrogen and crude monosulfide. If desired, however, the entire amounts of the crude monosulfide, metal and acid may be mixed and the mixture heated to temperatures between 30° and about 110° C. with agitation.

After the above reaction is complete, the reaction mixture may be filtered to remove insoluble material therefrom and the organic layer separated. The organic layer is then distilled at any convenient pressure to remove thiophenol in the forefraction. A diphenyl monosulfide fraction is next obtained, which is substantially colorless and odorless, boils over a narrow range of not more than 3° C. and contains no detectable amounts of thiophenol or diphenyl disulfide.

While the mechanism of the purification procedure of our invention is not definitely known, it has been observed that hydrogen sulfide is evolved during digestion of the crude monosulfide with the mixture of metal and acid. It is also believed that the diphenyl disulfide impurity is reduced by the nascent hydrogen to thiophenol, which material can be readily separated from the diphenyl monosulfide by distillation.

The following examples are illustrative of our invention. Amounts are given in parts by weight.

*Example 1.*—225 parts of crude diphenyl monosulfide produced by reaction of diphenyl sulfone and sulfur and having an objectionable color and odor were mixed with 100 parts of water and 50 parts of iron filings and the mixture was heated to reflux. 295 parts of 35% hydrochloric acid were added to the refluxing mixture with agitation over a period 1½ hours, and refluxing and agitation of the mass were continued for an additional hour. The mass was then filtered, and the organic layer isolated from the filtrate and distilled at a pressure of 3 mm. After removal of a thiophenol forefraction, a fraction consisting of 174 parts of a substantially odorless and colorless diphenyl monosulfide product free of diphenyl disulfide and thiophenol and boiling over a narrow range was obtained.

By contrast 225 parts of the same crude diphenyl monosulfide were digested for 1¾ hours on a steam bath with 35 parts of zinc dust and 100 parts of 40% aqueous sodium hydroxide solution, the mass filtered, and the organic layer separated from the filtrate and distilled to recover diphenyl monosulfide; the diphenyl monosulfide product recovered was yellow, as contrasted with the colorless product obtained in the above example, and boiled over a range of 113° to 118° C. at 1 mm. pressure.

*Example 2.*—500 parts of crude diphenyl monosulfide produced by reaction of diphenyl sulfone and sulfur and having objectionable color and odor, 200 parts of water and 65 parts zinc dust were mixed, the mixture heated to refluxing and 110 parts of 93% sulfuric acid were gradually added to the refluxing mixture with agitation over a period of 3 hours. At the end of this time the reaction mixture was filtered and the organic layer separated from the filtrate and distilled. After removal of a thiophenol forefraction, a colorless, odorless diphenyl monosulfide product boiling over a range of 2° C. and free of diphenyl disulfide and thiophenol was obtained.

*Example 3.*—298.5 parts of crude diphenyl monosulfide produced by reaction of diphenyl sulfone and sulfur and having objectionable color and odor, 71.6 parts of water and 15.2 parts of iron filings were mixed and heated on a steam bath at 85° to 95° C. 27.6 parts of 93% sulfuric acid were then added to the mixture with agitation over a 20-minute period, heating and agitation of the mass being continued for an additional 5 hours. At the end of this time the mass was filtered and the organic layer was recovered from the filtrate and distilled. After removal of a thiophenol forefraction, 218 parts of a substantially colorless, odorless diphenyl monosulfide product boiling over a narrow range and free of diphenyl disulfide and thiophenol were obtained.

Since certain changes may be made in carrying out the above process without departing from the scope of the invention, it is intended that all matter contained in the above description shall be interpreted as illustrative and not in a limiting sense. Thus, while the above description has dealt with purification of diphenyl monosulfide, it is to be understood other crude diaryl monosulfides may also be purified in the same manner. For example, the process of our invention may be applied to purification of crude aminoaryl or hydroxyaryl monosulfides prepared, for example, by reaction of the corresponding amine or phenol, respectively, with sulfur as described in Chemical Abstracts, vol. 28, page 5052 (1934); or it may be applied to purification of crude alkyl substituted or halogenated diaryl monosulfides prepared, for example, by reaction of the corresponding alkyl substituted or halogenated aromatic hydrocarbon with sulfur chloride or a substance generating sulfur chloride in the presence of iron or iron chloride.

We claim:

1. A process for the purification of crude diphenyl monosulfide of objectionable color and odor to produce a substantially colorless product boiling over a range of not more than 3° C. which comprises subjecting said diphenyl monosulfide to the action of a mixture of a metal above hydrogen in the electromotive series and an inorganic acid reactable with said metal to yield nascent hydrogen, at a temperature between about 30° and about 110° C., separating the thus treated diphenyl monosulfide from the reaction mixture and distilling to remove thiophenol.

2. A process for the purification of crude diphenyl monosulfide of objectionable color and odor produced by reaction of diphenyl sulfone and sulfur to produce a substantially colorless product, boiling over a range of not more than 3° C. which comprises subjecting said diphenyl monosulfide to the action of a mixture of a metal above hydrogen in the electromotive series and an inorganic acid reactable with said metal to yield nascent hydrogen, at a temperature between about 30° and about 110° C., separating the thus treated diphenyl monosulfide from the reaction mixture and distilling to remove thiophenol.

3. A process for the purification of crude diphenyl monosulfide of objectionable color and odor to produce a substantially colorless product, boiling over a range of not more than 3° C. which comprises mixing said diphenyl monosulfide with water and an amount of a metal above hydrogen in the electromotive series between about 5% and about 30% by weight of said sulfide, heating the mixture to a temperature between about 30° and about 110° C., gradually adding to the heated mixture with agitation an inorganic acid reactable with said metal to yield nascent hydrogen, separating the thus treated diphenyl monosulfide from the reaction mixture and distilling said sulfide to remove thiophenol.

4. A process for the purification of crude diphenyl monosulfide of objectionable color and odor to produce a substantially colorless product, boiling over a range of not more than 3° C., which comprises subjecting said crude diphenyl monosulfide to the action of a mixture of iron and an inorganic acid reactable therewith to yield nascent hydrogen, at a temperature between about 30° and about 110° C., separating the thus treated diphenyl monosulfide and distilling said sulfide to remove thiophenol.

5. A process for the purification of crude diphenyl monosulfide of objectionable color and odor to produce a substantially colorless product, boiling over a range of not more than 3° C., which comprises subjecting said crude diphenyl monosulfide to the action of a mixture of zinc and an inorganic acid reactable therewith to yield nascent hydrogen, at a temperature between about 30° and about 110° C., separating the thus treated diphenyl monosulfide and distilling said sulfide to remove thiophenol.

6. A process for the purification of crude diphenyl monosulfide of objectionable color and odor to produce a substantially colorless product, boiling over a range of not more than 3° C., which comprises subjecting said crude diphenyl monosulfide to the action of a mixture of iron and sulfuric acid at a temperature between about 30° and about 110° C., separating the thus treated diphenyl monosulfide and distilling said sulfide to remove thiophenol.

7. A process for the purification of crude diphenyl monosulfide of objectionable color and odor to produce a substantially colorless product, boiling over a range of not more than 3° C., which comprises subjecting said crude diphenyl monosulfide to the action of a mixture of zinc and sulfuric acid at a temperature between about 30° and about 110° C., separating the thus treated diphenyl monosulfide and distilling said sulfide to remove thiophenol.

8. A process for the purification of crude diphenyl monosulfide of objectionable color and odor to produce a substantially colorless product, boiling over a range of not more than 3° C., which comprises subjecting said crude diphenyl monosulfide to the action of a mixture of iron and hydrochloric acid at a temperature between about 30° and about 110° C., separating the thus treated diphenyl monosulfide and distilling said sulfide to remove thiophenol.

EVERETT E. GILBERT.
HOWARD D. SEGOOL.

REFERENCES CITED

The following references are of record in the file of this patent:

UNITED STATES PATENTS

| Number | Name | Date |
| --- | --- | --- |
| 1,933,410 | Blair et al. | Oct. 31, 1933 |

OTHER REFERENCES

Otto, Annalen Der Chemie & Pharmacie, vol. 143, page 213 (1867).

Vogt, Annalen Der Chemie & Pharmacie, vol. 119, page 149 (1861).

Certificate of Correction

Patent No. 2,456,500. December 14, 1948.

EVERETT E. GILBERT ET AL.

It is hereby certified that errors appear in the printed specification of the above numbered patent requiring correction as follows:

Column 1, line 29, for "2,102 200" read *2,102,200*; line 50, for "100° C." read *110° C.*; column 4, line 3, for the word "fillings" read *filings*; and that the said Letters Patent should be read with these corrections therein that the same may conform to the record of the case in the Patent Office.

Signed and sealed this 29th day of March, A. D. 1949.

[SEAL]

THOMAS F. MURPHY,
*Assistant Commissioner of Patents.*